Figures 1, 2:
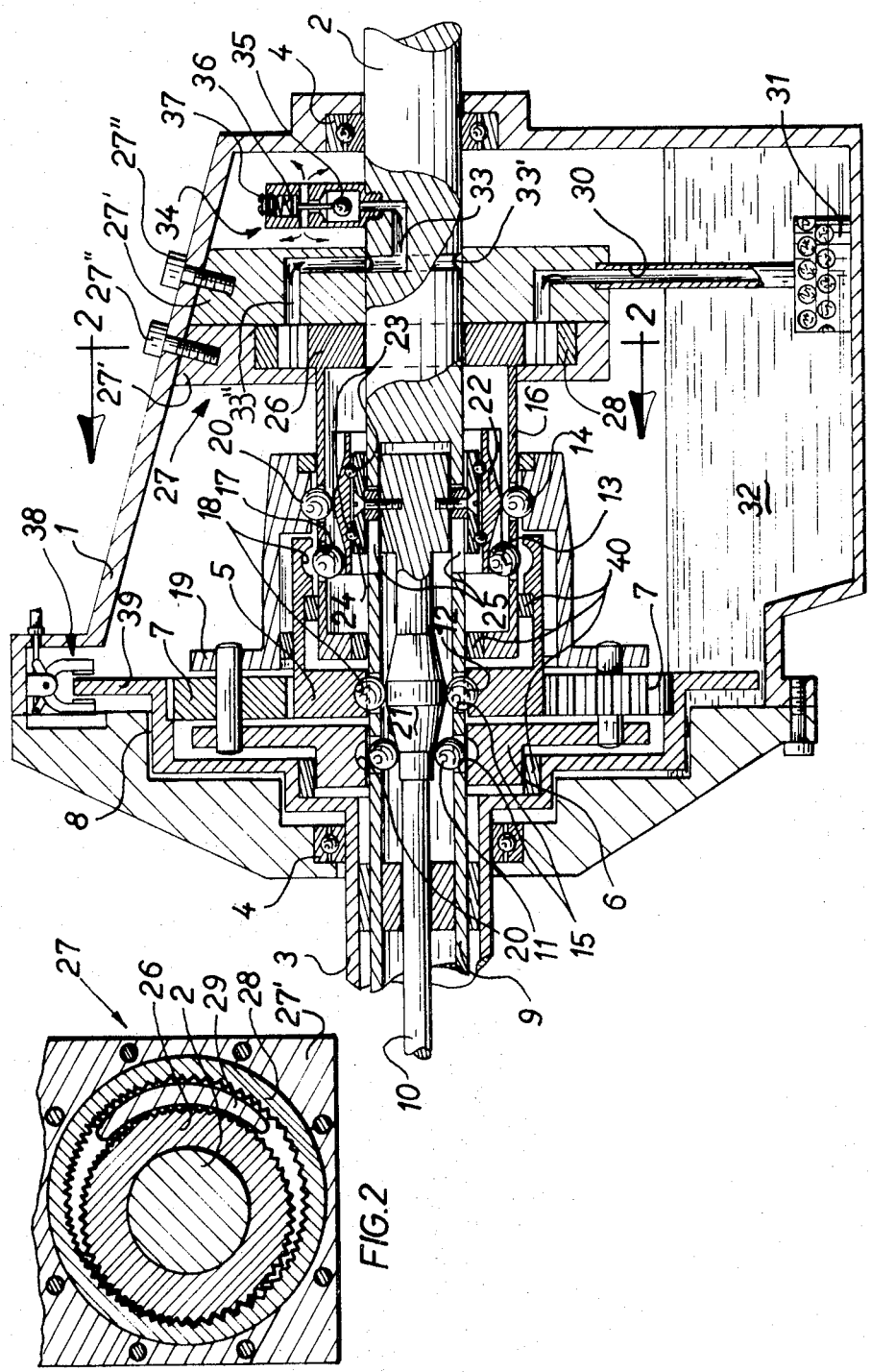

United States Patent [19]
Beaudoin et al.

[11] 3,788,167
[45] Jan. 29, 1974

[54] MULTIPLE-SPEED TRANSMISSION WITH REVERSE DRIVE

[75] Inventors: Yvon Beaudoin; Claude A. Gingras, both of Dosquet, Quebec, Canada

[73] Assignee: said Gingras, by said Beaudoin

[22] Filed: Aug. 2, 1973

[21] Appl. No.: 277,309

[52] U.S. Cl.................... 74/762, 74/758, 192/4 A
[51] Int. Cl............................................. F16h 57/10
[58] Field of Search............................. 74/762, 758

[56] References Cited
UNITED STATES PATENTS
| | | | |
|---|---|---|---|
| 2,613,550 | 10/1952 | Thurber | 74/762 X |
| 2,694,470 | 11/1954 | Gendron | 74/762 X |
| 3,099,925 | 8/1963 | Leonard | 74/372 |

Primary Examiner—Arthur T. McKeon

[57] ABSTRACT

Transmissions adapted in particular for small and relatively inexpensive applications and particularly for a safe forward and reverse multiple-speed drive for snowmobiles, all terrain vehicles, passenger vehicles, trucks and the like. A transmission including a single planetary gear set with the output shaft directly secured to the ring gear and having one of the sun gear and the planet carrier selectively driven by an input shaft and a braking unit arranged to gradually brake the planet carrier, or the sun gear, for reverse drive or forward drive respectively. An axially displaceable control member selectively locks either of the sun gear and the planet carrier to the braking unit for braking action thereby. The braking unit consists of a gear pump having a stator secured to the transmission casing and a rotor which is gradually braked by the centrifugal action on a valve controlling the outflow of the gear pump.

6 Claims, 2 Drawing Figures

PATENTED JAN 29 1974 3,788,167

MULTIPLE-SPEED TRANSMISSION WITH REVERSE DRIVE

This invention relates to a multiple-speed transmission with reverse drive.

It is a general object of the invention to provide a multiple-speed transmission which is adapted for small size construction and relatively inexpensive applications and, more particularly, to constitute a safe forward and reverse multiple-speed drive for a snowmobile, all terrain vehicles and the like.

It is another object of the invention to provide a multiple-speed transmission which produces a substantially frictionless gradual clutching between an input shaft and an output shaft.

It is another general object of the invention to provide a multiple-speed transmission which smoothly switches from forward to reverse and vice versa.

It is a more specific object of the invention to provide a multiple-speed transmission with reverse drive including a single planetary gear set having a sun gear and a planet carrier, a simple control member to select forward or reverse drive and a braking means to gradually and selectively brake either of the sun gear and the planet carrier, whereby to gradually vary the speed of an output shaft.

It is another object of the invention to provide a multiple-speed transmission including a centrifugally controlled braking means to effect automatic and gradual speed variation of an output shaft.

It is still another object of the invention to provide a multiple-speed transmission with reverse drive including a braking unit arranged to effect gradual speed variation and connected to control the selection of either forward or reverse drive.

The invention will now be described in detail with reference to specific embodiments of the invention which are illustrated, by way of example only, in the accompanying drawings, in which:

FIG. 1 is a longitudinal section of a multiple-speed transmission according to the invention; and FIG. 2 is a cross-sectional view as seen in the direction of the arrows along line 2—2 in FIG. 1.

The multiple-speed transmission according to the invention generally includes a casing 1, of any appropriate construction, to form a liquid-tight enclosure to contain oil into which the moving parts are at least partly immersed.

An input shaft portion 2 and an output shaft portion 3 are mounted by bearings 4 in end-to-end aligned relationship through opposite end portions of the casing 1. A planetary gear set is arranged inside the casing 1 in coaxial and cooperative association with the input and output shaft portions 2 and 3. The planetary gear set includes a sun gear 5, a planet carrier 6 and planet gears 7. The output shaft portion 3 is provided with an internally toothed ring gear portion 8 arranged in meshing engagement with the planet gears 7 to be driven by the latter. The input shaft portion 2 includes a hollow input shaft portion 9 around which are rotatably and coaxially mounted the sun gear 5 and the planet carrier 6.

A control member or rod 10 is movably mounted inside the hollow input shaft portion 9 for axial displacement relative thereto.

A locking device is carried by the input shaft portion 2 and an actuating member or element is fixed to the axially displaceable control member or rod 10 for displacement therewith, for selective locking of either of the sun gear 5 and the planet carrier 6 to the hollow input shaft portion 9 or to a rotatable braking member 16.

Referring now particularly to FIG. 1, it will be seen that the selection of either forward or reverse drive is obtained by four sets of locking balls respectively identified by reference numerals 11, 12, 13 and 14 arranged, as will be explained hereinafter, to constitute the above locking device.

Bores 15 are provided through the hollow input shaft portion 9 to form a ball carrier for the locking balls 11 and 12. Similarly, rotatable braking member 16 is provided with bores 17 therethrough to form a ball carrier for the locking balls 13 and 14. The sun gear 5 is provided with two sets of cavities 18 arranged to be in radial registry with the sets of locking balls 12 and 13 respectively. The planet carrier 6 including the auxiliary part 19 thereof is also provided with two sets of cavities 20 arranged to be in radial registry with the sets of locking balls 11 and 14 respectively.

To selectively actuate the locking balls 11 and 12, there is provided a radially camming portion, or enlargement 21, along the control member or rod 10. To selectively actuate the locking balls 13 and 14, there is provided a radially camming member, or sleeve 22, mounted on ball bearings 23 to allow rotation of the base 24 thereof with the hollow input shaft portion 9. Guide slots 25 extend longitudinally through the hollow input shaft portion 9 to allow axial displacement therein of the base 24 and the camming surface member or sleeve 22.

The rotatable braking member 16 is fixed to the toothed rotor or driving gear 26 of a gear pump 27 of a well known construction, including a driven gear 28 and a crescent 29. Meshing gears 26 and 28 are freely rotatable on input shaft 2. Crescent 29 is part of pump body 27' secured to housing 1 by bolts 27". The inlet of the gear pump 27 is connected by an oil line 30 and an oil filter 31 to an oil supply 32. The outlet of the gear pump 27 is constantly connected, via a passage 33" pump in body 27', a channel 33 and a circular groove 33' in the input shaft portion 2, to a governor valve 32 mounted on the latter for rotation therewith. The valve 34 includes a closing ball 35, a spring 36 biasing the closing ball 35 away from its seat and towards the input shaft portion 2, and an adjustment screw 37. The valve 34 is designed, whereby increasing centrifugal action produced by rotation of the input shaft portion 2 on the closing ball 35 gradually closes and interrupts the oil flow through the gear pump 27 and hence gradually brakes an interrupts the rotation of the rotor or driving gear 26 and the braking member 16.

Assuming that the displaceable forward-reverse control member 10 is in the right-hand position, as shown in FIG. 1, for reverse drive, input shaft 2 is locked to sun gear 5 and gear pump rotor 26 is locked to planet carrier 6.

Supposing output shaft 3 is at rest and input shaft 2 rotates at low speed with governor valve 34 open, planet carrier 6 rotates at half the speed of input shaft 2 and in the same direction; pump rotor 26, which is locked to planet carrier 6, pumps oil which is freely returned to oil supply 32.

With increase of input shaft speed, valve 34 gradually closes under centrifugal force decreasing rotational speed of planet carrier 6, thereby initiating and increasing rotation of ring gear 8 and output shaft 3 until the latter attains a maximum speed ratio when valve 34 is fully closed and planet carrier 6 is stationary. Planet gears 7, which rotate about stationary axes, produce reverse drive of ring gear 8 and output shaft 3. A neutral position is obtained by shifting control rod 10 to an intermediate position wherein balls 11, 12, 13, 14 clear cavities 20 and 18.

When the displaceable control member or rod 10 is moved towards the left into position to cause the camming elements 21 and 22 to push the balls 11 and 13 into their associated cavities 18 and 20, the planet carrier 6 is then driven by the rotation of the input shaft portion 2 and the sun gear 5 is gradually braked to a standstill by progressive closing of governor valve 34, resulting in forward drive of the output shaft portion 3.

It must be appreciated that in forward as well as in reverse drive conditions, the transmission ratio to the output shaft portion 3 is continuously variable within the predesigned range by gradual braking of one of the sun gear 5 and the planet carrier 6, as the case may be.

A manual braking unit 38 is provided to engage a flange 39 of the interiorly toothed ring gear 8 to brake the latter and the output shaft 3 when the vehicle is at rest.

Friction bearings 40 are provided in various places of the trasnmission, as is well known in the art, to allow relatively smooth and silent running.

Passage 33' of pump body 27' can be provided with a flow reducing valve manually operable from the exterior of casing 1 to temporarily stop the pump outflow and thus clutch the input and output shaft portions 2 and 3, whereby the vehicle can be pushed to start the engine when the latter would not start in normal manner. Also, the design of governor valve can be modified so that the oil flow towards the valve member 35 will flow radially inwardly so that valve member 35 will close against the oil pressure, as well as against spring 36. Obviously, the governor valve is designed to be dynamically balanced, as it rotates with shaft 2.

We claim:

1. A multiple-speed transmission with reverse drive comprising an input shaft means, an output shaft means, a planetary gear set for interconnecting said input shaft means and said output shaft means and including a ring gear secured to said output shaft means, a freely rotatable sun gear, a freely rotatable plant carrier and planet gear means freely rotatable on said planet carrier and intermeshing with said sun gear and said ring gear, a freely rotatable braking member arranged about said input shaft means and output shaft means, centrifugally-operated braking means responsive to the rotational speed of said input shaft means to gradually immobilize said braking member with increase of rotational speed of said input shaft means, and a manually-controlled locking means to interlock said sun gear to said input shaft means and said planet carrier to said brake member in a first position of said locking means and to interlock said planet carrier to said input shaft means and said sun gear to said brake member in a second position of said locking means.

2. A multiple-speed transmission with reverse drive as claimed in claim 1, wherein said input shaft means include a hollow shaft portion and said locking means include an elongated manually-movable member located within and axially movable relative to said hollow portion of said input shaft means, said movable member carrying a pair of camming means, two sets of locking balls operatively associated with each of said camming means, said input shaft portion defining a first ball carrier for carrying and rotating a first pair of sets of locking balls, said braking member defining a second ball carrier for carrying and rotating a second pair of sets of locking balls, said sun gear and plant carrier being each provided with two sets of cavities for respectively receiving a set of locking balls of said first and second pair of sets, said camming means each arranged to alternatively cause locking engagement and release of the locking balls of the two pairs of sets associated therewith with the sun gear and plant carrier respectively.

3. A multiple-speed transmission as claimed in claim 1, wherein said braking means include a rotary pump having a stator housing which is fixedly mounted and a rotor rotatably mounted into said stator housing, said braking member being secured to said rotor for rotation therewith, and outlet fluid line connected to said pump and a centrifugally-operated governor valve secured to said input shaft means for bodily rotation therewith and connected to the outlet fluid line of said rotary pump to gradually reduce and interrupt the fluid flow through said pump and, therefore, the rotational speed of said motor with progressively increasing rotational speed of said input shaft means.

4. A multiplespeed transmission as defined in claim 3, wherein said rotary pump is a gear pump surrounding said input shaft means with said rotor being intermeshing outer and inner annular gears freely rotatable around and with said inner gear coaxial with said input shaft means, said outer annular gear eccentric with respect to inner annular gear, and a crescent member secured to said stator housing and extending between said inner and outer gears.

5. A multiple-speed transmission as claimed in claim 4, wherein said stator housing includes a fluid outlet passage and said input shaft means include a fluid outlet passage in permanent communication with the fluid outlet passage of said stator housing and in permanent communication with the intake of said governor valve, said governor valve having a valve member and a valve seat, said valve member moving under centrifugal force towards said seat to close the outlet of said valve and an adjustable spring urging said valve member into valve opening position.

6. A multiple-speed transmission as claimed in claim 5, wherein the intake of said valve directs the fluid flow radially inwardly against said valve member.

* * * * *